(12) United States Patent
Liu et al.

(10) Patent No.: US 9,239,592 B1
(45) Date of Patent: Jan. 19, 2016

(54) DOCKING STATION

(71) Applicants: Yu-Wen Liu, Taipei (TW); Chin-Kuo Huang, Taipei (TW); Long-Cheng Chang, Taipei (TW); Hsien-Tang Liao, Taipei (TW); Yi-Ju Liao, Taipei (TW)

(72) Inventors: Yu-Wen Liu, Taipei (TW); Chin-Kuo Huang, Taipei (TW); Long-Cheng Chang, Taipei (TW); Hsien-Tang Liao, Taipei (TW); Yi-Ju Liao, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 14/470,952

(22) Filed: Aug. 28, 2014

(30) Foreign Application Priority Data

Jul. 17, 2014 (TW) .............................. 103124554 A

(51) Int. Cl.
*G06F 1/16* (2006.01)
(52) U.S. Cl.
CPC .................................. *G06F 1/1632* (2013.01)
(58) Field of Classification Search
CPC ..................................................... G06F 1/1632

USPC ...................................................... 361/679.41
See application file for complete search history.

(56) References Cited

U.S. PATENT DOCUMENTS

| | | | |
|---|---|---|---|
| 2014/0177162 A1* | 6/2014 | Ho .......................... | G06F 1/1616 361/679.43 |
| 2015/0055289 A1* | 2/2015 | Chang ................... | G06F 1/1632 361/679.43 |

* cited by examiner

*Primary Examiner* — Anthony Q Edwards
(74) *Attorney, Agent, or Firm* — Jianq Chyun IP Office

(57) ABSTRACT

A docking station including fixing base and at least one latching module is provided. The latching module includes a latching element, a first restoring element, a stopping element, a second restoring element and a pushing element. The first restoring element is connected to the latching element and the fixing base and drives the latching element to latch a tablet device. The stopping element is coupled to the latching element and has a recess. The second restoring element is connected to the stopping element and the fixing base and drives the stopping element to stop the latching element. The pushing element is adapted to be pushed and inserted into the recess to drive the stopping element to move away from the latching element, and the tablet device is adapted to be released from the latching element by pushing the latching element after the stopping element moves away from the latching element.

12 Claims, 12 Drawing Sheets

100# DOCKING STATION

CROSS-REFERENCE TO RELATED APPLICATION

This application claims the priority benefit of Taiwan application serial no. 103124554, filed on Jul. 17, 2014. The entirety of the above-mentioned patent application is hereby incorporated by reference herein and made a part of this specification.

BACKGROUND

1. Technical Field

The invention relates to a docking station, and particularly relates to a docking station applied to a tablet device.

2. Related Art

In recent years, along with increasing development of science and technology industry, electronic devices such as notebooks, tablet personal computers (PCs) and smart phones are frequently used in daily life. Types and functions of the electronic devices become more and more diversified, and the electronic devices become more popular due to convenience and practicality thereof, so as to be applied to different usages according to user's requirement. Moreover, in order to improve practicality of the electronic devices, many electronic devices can be connected to a docking station, for example, connected to a keyboard device or an audio device for increasing operational functions of the electronic devices through the docking station, for example, the docking station is used as an input output interface.

Taking a tablet device as an example, a touch panel of the tablet device is generally used as an input interface. Moreover, the tablet device can also be assembled to a docking station, for example, an external keyboard device, to take the docking station as the input interface, and the tablet device and the external keyboard device serving as the docking station can be assembled into a notebook. In this way, in order to prevent the tablet device from falling off from the docking station, the docking station is generally configured with a latching structure used for latching the tablet device. The latching structure generally adopts a movable latch to interfere with a part of the tablet device to fix the tablet device, and the latch can be pushed by an external force to release the interference between the latch and the tablet device, such that the tablet device can be disassembled from the docking station. In this way, the tablet device is probably swayed or affected by an external force along with motion of the user during a carrying process, and probably falls off from the docking station unintentionally. Therefore, the tablet device assembled to the docking station is inconvenient to carry around.

SUMMARY

The invention is directed to a docking station, which has good fixability and is easy to be disassembled.

The invention provides a docking station adapted to latch a tablet device. The docking station includes a fixing base and at least one latching module. The latching module includes a latching element, a first restoring element, a stopping element, a second restoring element and a pushing element. The latching element is movably disposed on the fixing base, and is adapted to latch the tablet device. The first restoring element is connected to the latching element and the fixing base and drives the latching element to latch the tablet device. The stopping element is movably disposed on the fixing base, and is coupled to the latching element to stop the latching element from generating displacements, and the stopping element has a recess. The second restoring element is connected to the stopping element and the fixing base and drives the stopping element to stop the latching element. The pushing element is movably disposed on the fixing base, and is disposed at one side of the stopping element, wherein the pushing element is adapted to be pushed and inserted into the recess, so as to drive the stopping element to move away from the latching element, and the tablet device is adapted to be released from the latching element by pushing the latching element after the stopping element moves away from the latching element.

In an embodiment of the invention, the first restoring element includes a pair of magnets repelling each other, which are respectively disposed on the latching element and the fixing base to drive the latching element to latch the tablet device.

In an embodiment of the invention, the first restoring element includes an elastic element, which is connected to the latching element and the fixing base to drive the latching element to latch the tablet device.

In an embodiment of the invention, the second restoring element includes a pair of magnets repelling each other, which are respectively disposed on the stopping element and the fixing base to drive the stopping element to stop the latching element.

In an embodiment of the invention, the second restoring element includes an elastic element, which is connected to the stopping element and the fixing base to drive the stopping element to stop the latching element.

In an embodiment of the invention, the pushing element is inserted into the recess along a first axial direction, and the stopping element moves away from the latching element along a second axial direction, wherein the first axial direction and the second axial direction include an acute angle.

In an embodiment of the invention, the fixing base has an inserting slot and a sliding slot. The inserting slot extends along the first axial direction, the sliding slot extends along the second axial direction, and the inserting slot and the sliding slot are communicated to each other. The stopping element is movably disposed in the sliding slot, and the pushing element is movably disposed in the inserting slot. When the pushing element is inserted into the recess along the inserting slot, the stopping element moves away from the latching element along the sliding slot.

In an embodiment of the invention, the latching element is pushed along a third axial direction to release latching the tablet device after the stopping element moves away from the latching element along the second axial direction. The first axial direction is perpendicular to the third axial direction, and the second axial direction is perpendicular to the third axial direction.

In an embodiment of the invention, the recess of the stopping element has a first slope facing the pushing element. The pushing element has a second slope facing the stopping element, and the first slope and the second slope are matched to each other.

In an embodiment of the invention, the pushing element has a pushing portion and an inserting portion connected to each other, wherein the pushing portion is located outside the fixing base, and the inserting portion is located inside the fixing base and corresponds to the recess, and the pushing element is adapted to be pushed through the pushing portion and is inserted into the recess through the inserting portion.

In an embodiment of the invention, the pushing element has a pushing direction and an inserting direction. The pushing element is adapted to be pushed along the pushing direction, and is adapted to be inserted into the recess along the inserting direction, and an included angle between the pushing direction and the inserting direction ranges from −45 degrees to 45 degrees.

In an embodiment of the invention, the number of the latching modules is two, the latching modules are respectively located at two opposite sides of the fixing base, and the first restoring elements respectively drive the corresponding two latching elements to move towards the two opposite sides of the fixing base to latch the tablet device.

According to the above descriptions, in the docking station of the invention, the latching element of the latching module is adapted to latch the tablet device, wherein the first restoring element drives the latching element to latch the tablet device, the stopping element stops the latching element from generating displacements, and the second restoring element drives the stopping element to stop the latching element. In this way, the latching element that latches the tablet device is limited by being driven through the first restoring element and is limited by the stopping element driven by the second restoring element to fix to a predetermined position, so as to avoid a situation that the tablet device latched to the docking station falls off from the docking station due to sway of the tablet device generated during a carrying process. Moreover, the pushing element is adapted to be pushed and inserted into the recess to drive the stopping element to move away from the latching element. In this way, the tablet device is adapted to be released from the latching element by pushing the latching element after the stopping element moves away from the latching element. Therefore, the docking station of the invention has good fixability and is easy to be disassembled.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
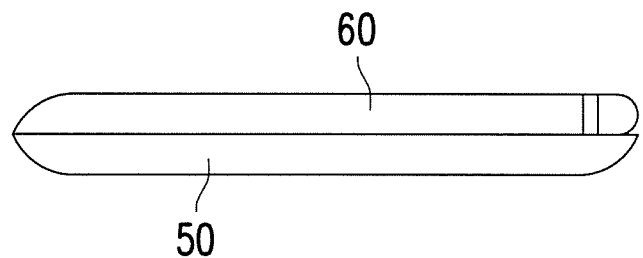
FIG. 1A to FIG. 1C are schematic diagrams of assembling and disassembling a docking station and a tablet device according to an embodiment of the invention.
Figure 1B:
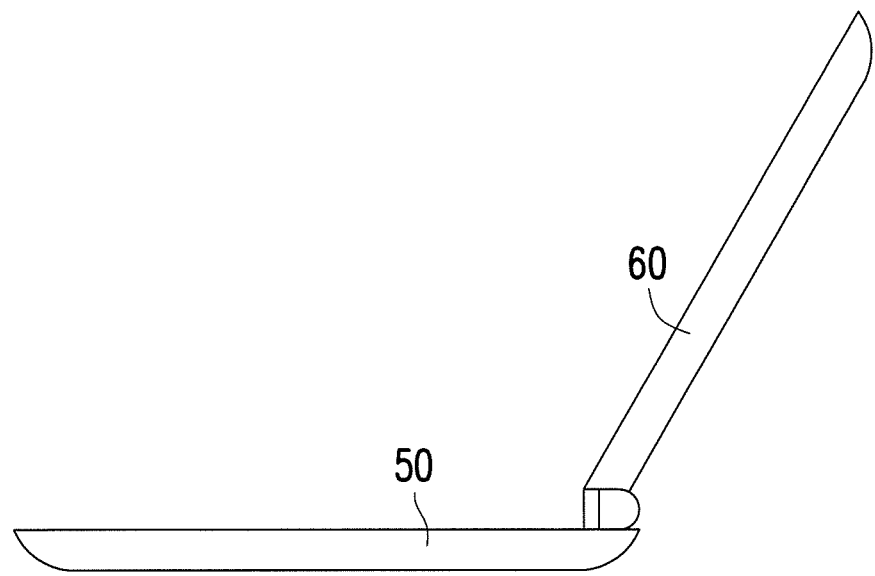
Figure 1C:
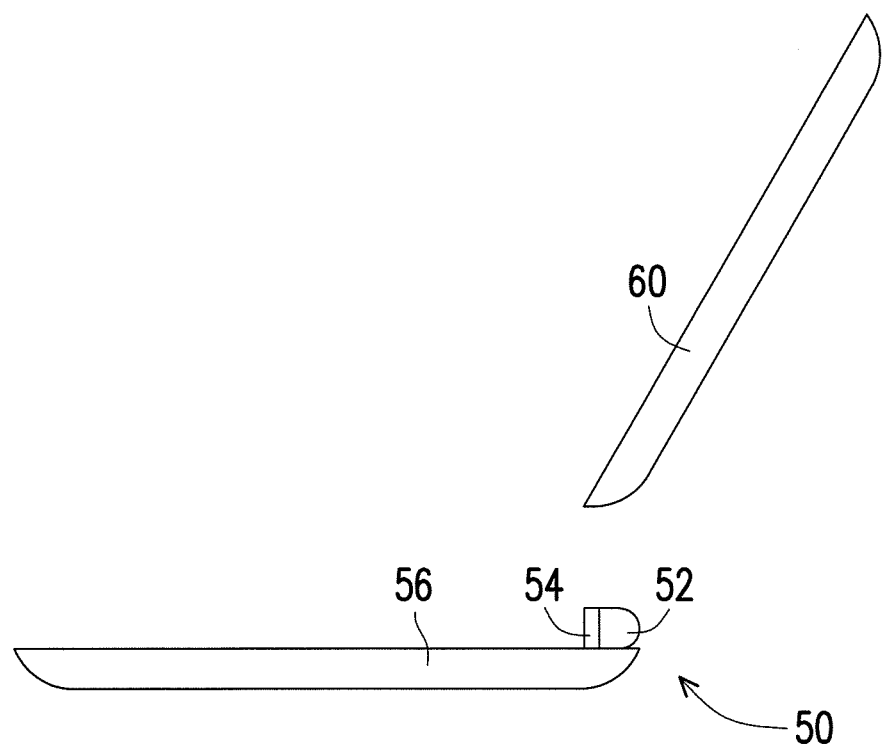

FIG. 1A to FIG. 1C are schematic diagrams of assembling and disassembling a docking station and a tablet device according to an embodiment of the invention. Referring to FIG. 1A to FIG. 1C, in the present embodiment, the docking station 50 is adapted to latch the tablet device 60, wherein the docking station 50 is, for example, an external keyboard module, and the tablet device 60 is assembled to the docking station 50 to increase an application function of the tablet device 60, for example, take the external keyboard module serving as the docking station 50 as an input interface. However, the type of the docking station 50 is not limited by the invention, which can be adjusted according to an actual requirement. In this way, the tablet device 60 and the docking station 50 are electrically connected to each other through corresponding connecting ports and connecting terminals, so as to increase a corresponding function of the tablet device 60, and the tablet device 60 is latched to the docking station 50, such that the tablet device 60 is prevented from falling off from the docking station 50 during an operation process thereof. After the tablet device 60 is assembled to the docking station 50, the docking station 50 and the tablet device 60 can serve as a portable electronic device, for example, a notebook, though the invention is not limited thereto. As such, the tablet device 60 assembled to the docking station 50 can be overlapped to the docking station 50, or rotated and spread relative to the docking station 50, as that shown in FIG. 1A and FIG. 1B. Moreover, the tablet device 60 can also be disassembled from the docking station 50 and independently used, as that shown in FIG. 1C. Therefore, the tablet device 60 can be assembled to the docking station 50 or disassembled from the docking station 50 according to an actual requirement.

Figure 2:
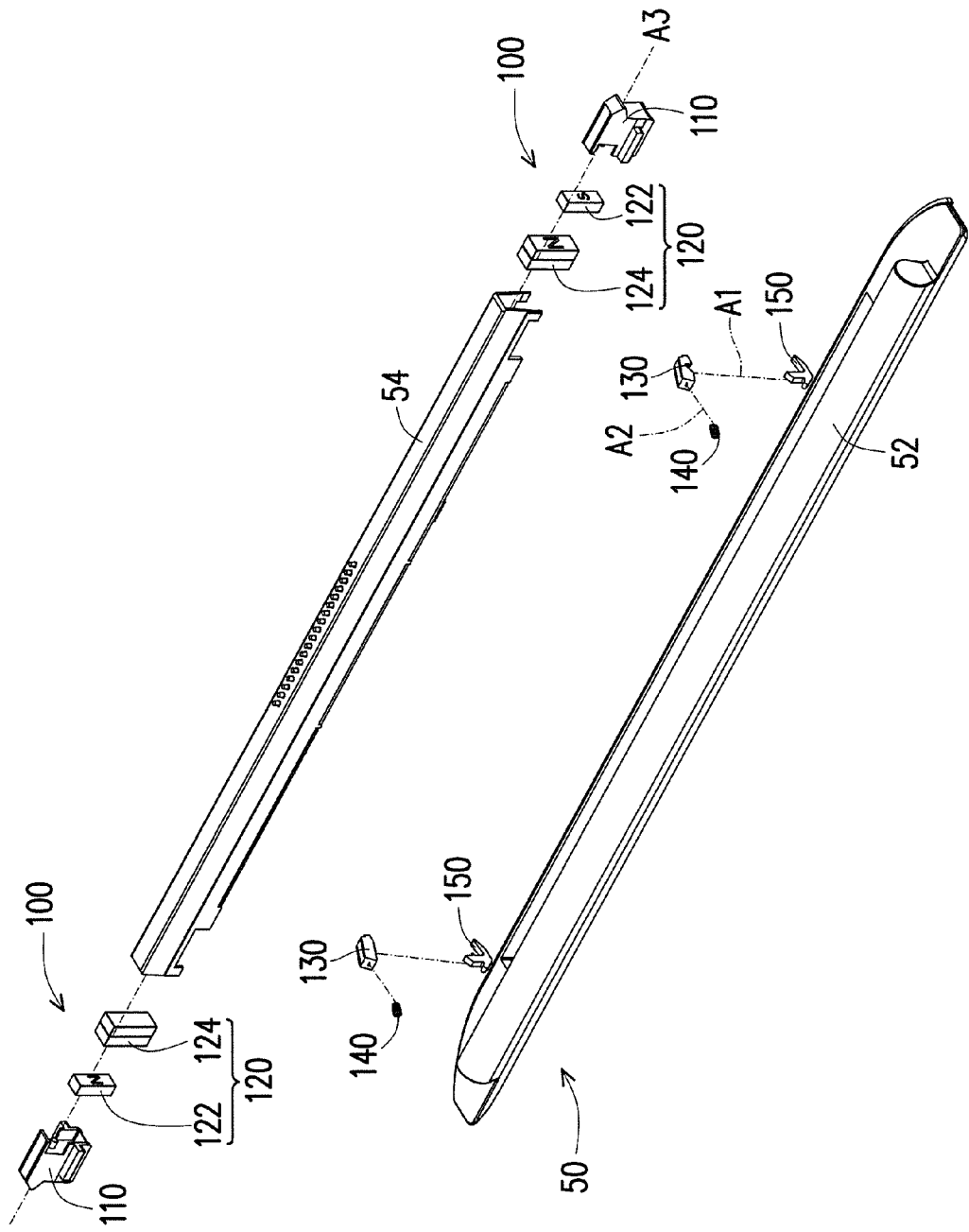
FIG. 2 is a partial exploded view of the docking station of FIG. 1.
Figure 3A:
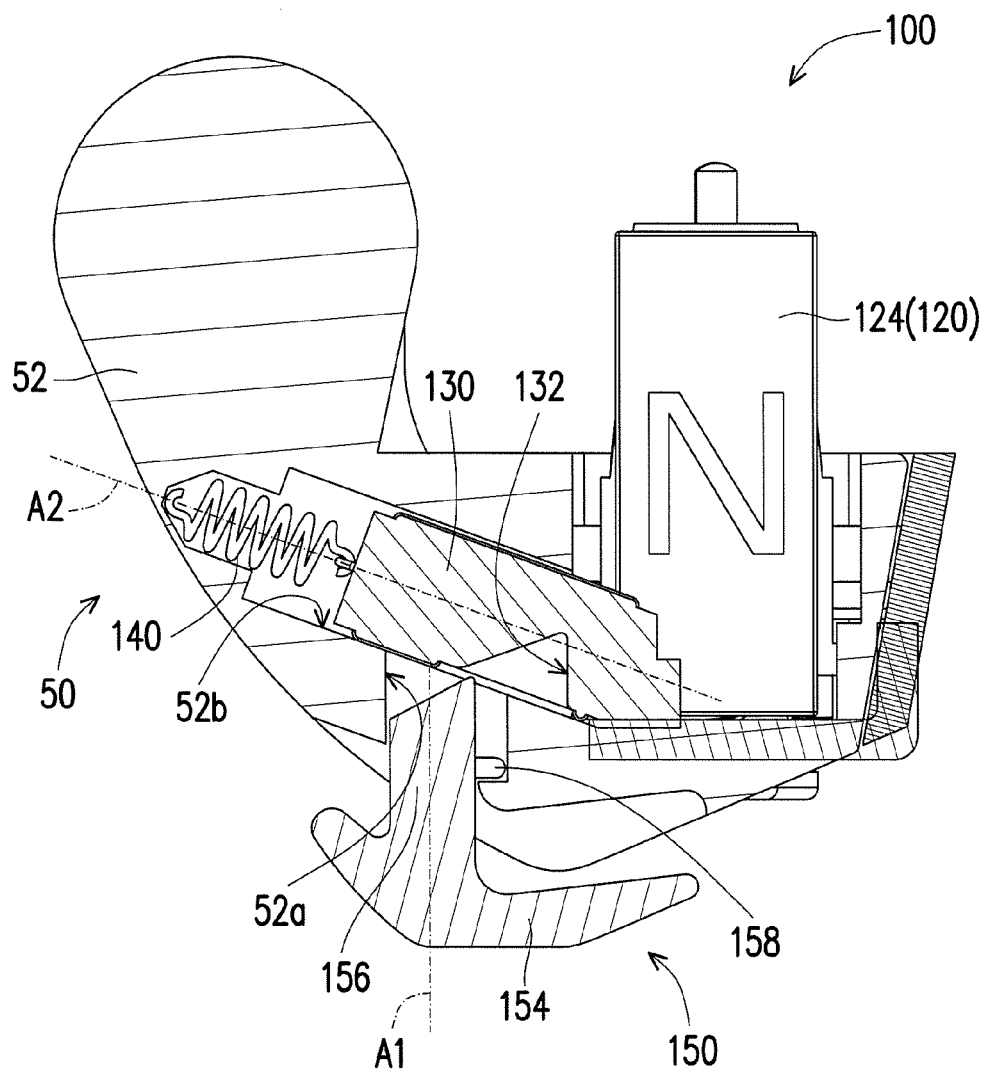
FIG. 3A is a partial cross-sectional view of the docking station of FIG. 2.

FIG. 2 is a partial exploded view of the docking station of FIG. 1. FIG. 3A is a partial cross-sectional view of the docking station of FIG. 2. Referring to FIG. 1C, FIG. 2 and FIG. 3A, in the present embodiment, the docking station 50 includes a fixing base 52, a shielding element 54, an expanding element 56 and two latching modules 100. The fixing base 52 is fixed on the expanding element 56 (shown in FIG. 1C), wherein the expanding element 56 is, for example, keyboard module. The latching modules 100 are located at two opposite sides of the fixing base 52, and the shielding element 54 is disposed on the fixing base 52 to shield the latching modules 100. However, the type and configuration of the shielding element 54 and the expanding element 56 are not limited by the invention, which can be adjusted according to an actual requirement. Moreover, in the present embodiment, the latching module 100 includes a latching element 110, a first restoring element 120, a stopping element 130, a second restoring element 140 and a pushing element 150. The latching element 110 is movably disposed on the fixing base 52, and is adapted to latch the tablet device 60. The first restoring element 120 is connected to the latching element 110 and the fixing base 52 and drives the latching element 110 to latch the tablet device 60. The stopping element 130 is movably disposed on the fixing base 52, and is coupled to the latching element 110 to stop the latching element 110 from generating displacements. The second restoring element 140 is connected to the stopping element 130 and the fixing base 52 and drives the stopping element 130 to stop the latching element 110. The pushing element 150 is movably disposed on the fixing base 52, and is disposed at a side of the stopping element 130. Therefore, the stopping element 130 of the present embodiment stops the latching element 110 that latches the tablet device 60 from generating displacements, such that the latching element 110 can be limited to a predetermined position after latching the tablet device 60, so as to prevent the tablet device 60 from falling off from the docking station 50. In this way, the docking station 50 of the present embodiment has good fixability.

In detail, in the present embodiment, the first restoring element 120, for example, includes a pair of magnets 122 and 124 repelling each other, which are respectively disposed on the latching element 110 and the fixing base 52, so that the magnets 122 and 124 used as the first restoring element 120 can drive the latching element 110 to latch the tablet device 60 (shown in FIG. 1A) through a repelling force there between. In other words, based on the repelling force between the magnets 122 and 124 used as the first restoring element 120, the latching element 110 latches the tablet device 60. However, the type of the first restoring element 120 is not limited by the invention, which can be selected according to an actual requirement. Moreover, since the two latching modules 100 of the present embodiment are respectively located at two opposite sides of the fixing base 52, the first restoring elements 120 of the latching modules 100 respectively drive the corresponding two latching elements 110 to move towards the two opposite sides of the fixing base 52, such that the latching elements 110 move outwards from the fixing base 52 to respectively embed in a local part of the tablet device 60 to latch the tablet device 60. In a general situation, although the magnets 122 and 124 used as the first restoring element 120 can drive the latching element 110 to latch the tablet device 60 through the repelling force there between, the tablet device 60 can still be released from the latching element 110 through an external force to overcome the repelling force between the magnets 122 and 124 used as the first restoring element 120. Therefore, in the present embodiment, the stopping element 130 is used to stop the latching element 110 from generating displacements, such that the tablet device 60 can be stably latched to the docking station 50.

In the present embodiment, the stopping element 130 is, for example, a hook or a block, which is movably disposed on the fixing base 52 and is coupled to the latching element 110, wherein the stopping element 130 can be disposed at one side of the latching element 110 and located between the magnets 122 and 124 used as the first restoring element 120, or can be engaged to a local part of the latching element 110, and the type of the stopping element 130 and a concrete implementation that the stopping element 130 stops the latching element 110 are not limited by the invention. Moreover, in the present embodiment, the stopping element 130 is driven by the second restoring element 140 and is fixed to a predetermined position. The second restoring element 140 is, for example, an elastic element, which is connected to the stopping element 130 and the fixing base 52, such that the elastic element used as the second restoring element 140 can drive the stopping element 130 to stop the latching element 10 through an elastic restoring force thereof. In other words, based on the elastic restoring force of the elastic element used as the second restoring element 140, the stopping element 130 stops the latching element 110 from generating displacements. However, in other embodiments, the second restoring element may also adopt a pair of magnets repelling each other, which are respectively disposed on the stopping element and the fixing base to drive the stopping element to stop the latching element through the repelling force there between. The type of the second restoring element is not limited by the invention, which can be selected according to an actual requirement. In this way, through being driven by the second restoring element 140, the stopping element 130 and the latching element 110 are interfered to stop the latching element 110 from generating displacements, such that the latching element 110 can stably latch the tablet device 60.

Figure 3B:
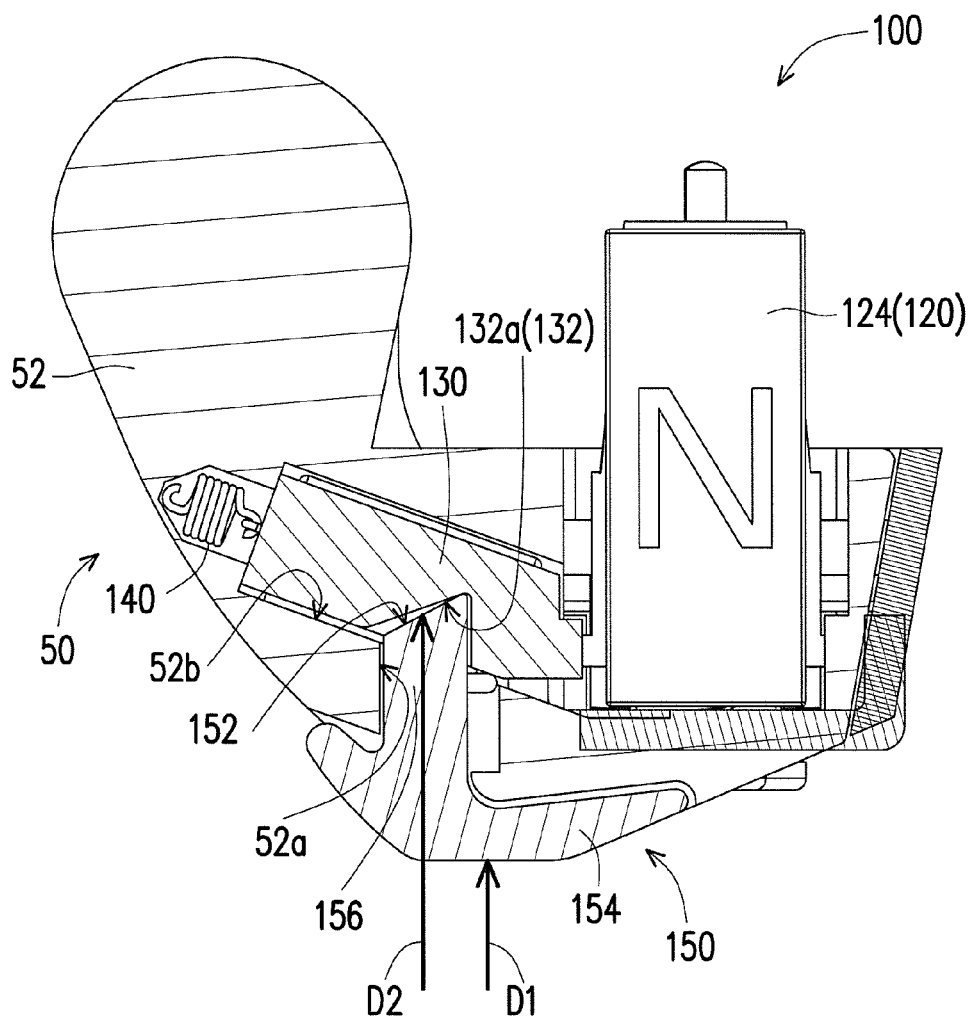
FIG. 3B is a motion schematic diagram of the docking station of FIG. 3A.

FIG. 3B is a motion schematic diagram of the docking station of FIG. 3A. Referring to FIG. 3A and FIG. 3B, in the present embodiment, since the latching element 110 (shown in FIG. 2) is stopped at a predetermined position by the stopping element 130, in order to disassemble the tablet device 60 from the docking station 50, the pushing element 150 is used to drive the stopping element 130 to move away from the latching element 110, such that the latching element 110 releases latching the tablet device 60 via displacements after the stopping element 130 moves away from the latching element 110. In the present embodiment, the pushing element 150 is, for example, a bolt, which is movably disposed on the fixing base 52, and is located under the stopping element 130, so that the pushing element 150 is adapted to be pushed to move towards the stopping element 130, though the type of the pushing element 150 is not limited by the invention. Moreover, the stopping element 130 has a recess 132, and the pushing element 150 corresponds to the recess 132. In this way, the pushing element 150 is adapted to be pushed and inserted into the recess 132 of the stopping element 130, so as to drive the stopping element 130 to move away from the latching element 110. The tablet device 60 is still latched to the latching element 110 after the stopping element 130 moves away from the latching element 110, but the tablet device 60 is adapted to be released from the latching element 110 by pushing the latching element 110 after the stopping element moves away from the latching element, so as to be disassembled from the docking station 50.

Figure 4A:
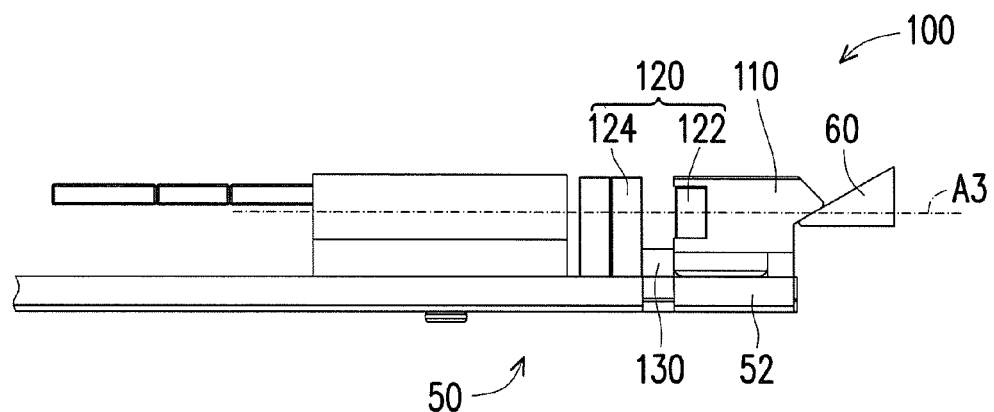
FIG. 4A to FIG. 4D are schematic diagrams of disassembling the docking station and the tablet device of FIG. 2.

In detail, in the present embodiment, the fixing base 52 has an inserting slot 52a and a sliding slot 52b. The inserting slot 52a extends along a first axial direction A1, the sliding slot 52b extends along a second axial direction A2, wherein the first axial direction A1 and the second axial direction A2 include an acute angle there between, and the inserting slot 52a and the sliding slot 52b are communicated to each other. The pushing element 150 is movably disposed in the inserting slot 52a, and the stopping element 130 is movably disposed in the sliding slot 52b. In this way, when the pushing element 150 is inserted into the recess 132 along the inserting slot 52a (the first axial direction A1), the stopping element 130 moves away from the latching element 110 along the sliding slot 52b (the second axial direction A2). Further, in the present embodiment, the recess 132 of the stopping element 130 has a first slope 132a facing the pushing element 150. The pushing element 150 has a second slope 152 facing the stopping element 130. The first slope 132a and the second slope 152 are matched to each other. In this way, when the pushing element 150 is inserted into the recess 132 along the inserting slot 52a (the first axial direction A1), the pushing element 150 is inserted into the recess 132 along the first slop 132a via the second slop 152, and drive the stopping element 130 to move away from the latching element 110 along the sliding slot 52b (the second axial direction A2) through the second slope 152 leans against the first slope 132a. After the stopping element 130 moves away from the latching element 110, the stopping element 130 is withdrawn from a place between the magnets 122 and 124 used as the first restoring element 120 to move away from the latching element 110, as that shown in FIG. 3B. Moreover, in the present embodiment, the latching element 110 can be pushed along a third axial direction A3 (shown in FIG. 4A) to release latching the tablet device 60 after the stopping element 130 moves away from the latching element 110 along the second direction A2. The third axial direction A3 can be regarded as a direction pointing into the figure of FIG. 3B. In this way, the first axial direction A1 is perpendicular to the third axial direction A3 in space, and the second axial direction A2 is perpendicular to the third axial direction A3 in space. However, the invention is not limited to the aforementioned implementation, and the above implementation can be adjusted according to an actual requirement.

A detailed method that the latching element 110 moves along the third axial direction A3 is described later.

Moreover, in the present embodiment, the pushing element 150 has a pushing portion 154 and an inserting portion 156 connected to each other. The pushing portion 154 is located outside the fixing base 52, and the inserting portion 156 is located inside the fixing base 52 and corresponds to the recess 132. The pushing element 150 is adapted to be pushed through the pushing portion 154 and is inserted into the recess 132 through the inserting portion 156. For example, when the docking station 50 is disposed on a platform, for example, on a desktop, and the tablet device 60 is in a spread state (as that shown in FIG. 1B), the pushing portion 154 of the pushing element 150 is located outside the fixing base 52, and leans against the desktop and is pushed by the same, such that the inserting portion 156 is inserted into the recess 132, as shown in FIG. 3A to FIG. 3B. Thereafter, when the docking station 50 is moved away from the desktop, the pushing element 150 can move out from the recess 132 through a manual operation or through gravity, wherein the pushing element 150 has a position limiting portion 158 located on the inserting portion 156, and the position limiting portion 158 is adapted to interfere with the fixing base 52 after the pushing element 150 moves out from the recess 132, so as to prevent the pushing element 150 from falling off from the fixing base 52. In this way, after the pushing element 150 moves out from the recess 132, the stopping element 130 is driven by the restoring force provided by the second restoring element 140 and is moved to stop the latching element 110, as shown in FIG. 3B to FIG. 3A. In this way, when the docking station 50 is placed on the desktop, and the tablet device 60 is in the spread state, the stopping element 130 moves away from the latching element 110, such that the tablet device 60 in the spread state can be disassembled from the docking base 50 or assembled to the docking base 50 according to an actual requirement.

Moreover, in the present embodiment, the pushing element 150 has a pushing direction D1 and an inserting direction D2. The pushing element 150 is adapted to be pushed along the pushing direction D1, and is adapted to be inserted into the recess 132 along the inserting direction D2, and an included angle between the pushing direction D1 and the inserting direction D2 ranges from −45 degrees to 45 degrees. The pushing direction D1 can be regarded as a direction of a positive force generated when the pushing portion 154 of the pushing element 150 contacts the desktop, and the inserting direction D2 can be regarded as a direction along which the inserting portion 156 of the pushing element 150 is inserted into the recess 132, i.e. the aforementioned first axial direction A1. In the present embodiment, the pushing direction D1 and the inserting direction D2 are parallel (the included angle there between is 0 degree), as that shown in FIG. 3B. However, in other embodiments that are not illustrated, as long as the tablet device 60 is in the spread state, and the included angle between the pushing direction D1 and the inserting direction D2 of the pushing element 150 ranges from −45 degrees to 45 degrees, the pushing element 150 can be pushed to drive the stopping element 130 to move away from the latching element 110. In this way, the tablet device 60 in the spread state can be disassembled from the docking station 50 according to an actual requirement. However, when the docking station 50 is placed on the desktop, and the tablet device 60 is in an overlapping state (shown in FIG. 1A), the included angle between the pushing direction D1 (the direction of the positive force generated between the pushing portion 154 and the desktop) and the inserting direction D2 of the pushing element 150 is 90 degrees, so that even if a part of the pushing element 150 contacts the desktop, the pushing element 150 cannot be pushed by the desktop for inserting into the recess 132. Therefore, the stopping element 130 maintains stopping the latching element 110, and the tablet device 60 in the overlapping state cannot be disassembled from the docking station 50. In this way, when the docking station 50 and the tablet device 60 are in the overlapping state to facilitate carrying around, the docking station 50 and the tablet device 60 are not liable to be separated due to sway generated due to motion of the user during a carrying process, i.e. as the stopping element 130 stops the latching element 110, the tablet device 60 is prevented from falling off from the docking station 50 during the carrying process. The tablet device 60 can be released from the latching element 110 when the docking station 50 and the tablet device 60 are placed on the desktop or other platforms and are in the spread state.

Figure 4B:
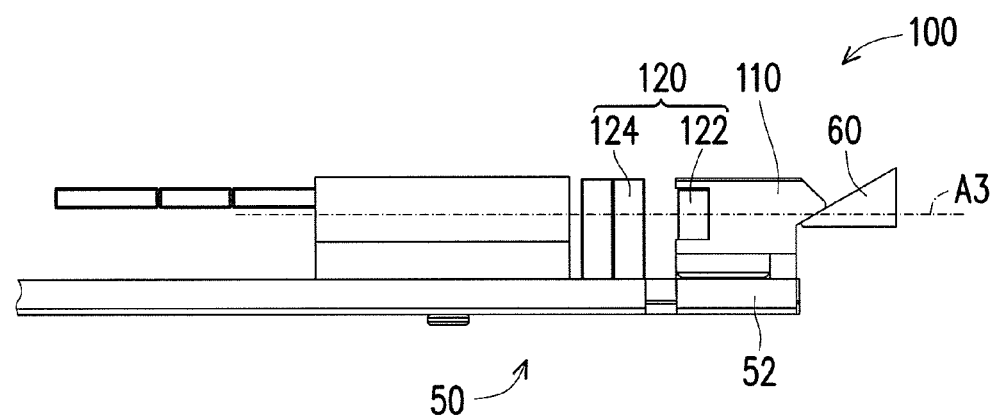
Figure 4C:
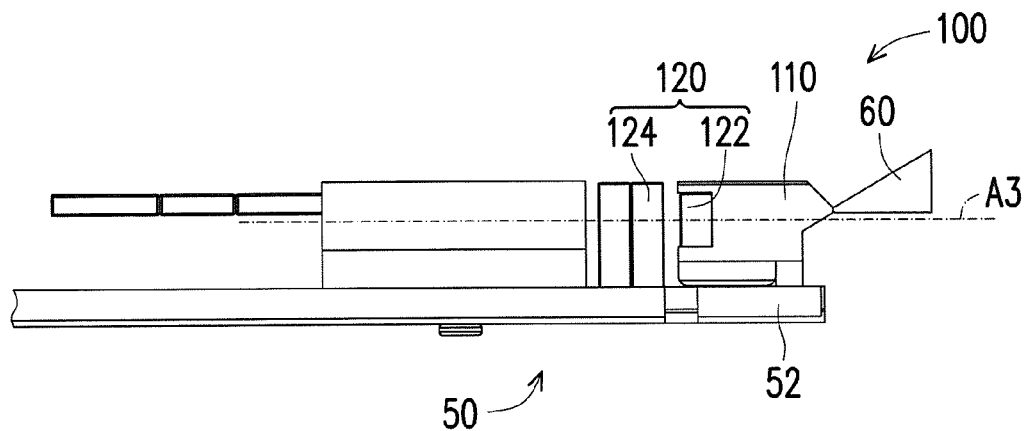
Figure 4D:
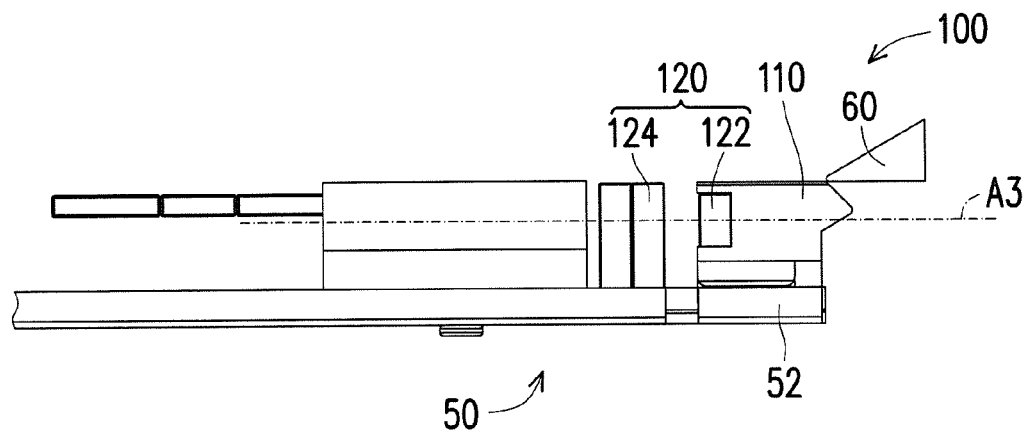

FIG. 4A to FIG. 4D are schematic diagrams of disassembling the docking station and the tablet device of FIG. 2. First, in FIG. 4A, the latching element 110 latches a local part (the whole tablet device 60 is represented by a local part) of the tablet device 60, and the stopping element 130 stops the latching element 110 from generating displacements along the third axial direction A3. In this way, the tablet device 60 cannot be disassembled from the docking station 50 through an external force under a premise that the docking station 50 and the tablet device 60 are not damaged. Thereafter, in FIG. 4B, the stopping element 130 moves away from the latching element 110, and a process thereof is as that shown in FIG. 3A to FIG. 3B. Thereafter, in FIG. 4C, since the stopping element 130 has moved away from the latching element 110, the latching element 110 latches the tablet device 60 only through a repelling force between the magnets 122 and 124 used as the first restoring element 120. Now, the tablet device 60 can be moved relative to the latching element 110 through an external force, wherein the external force is greater than the repelling force between the magnets 122 and 124 used as the first restoring element 120, such that the tablet device 60 pushes the latching element 110 to move along the third axial direction A3 through moving relative to the latching element 110. Thereafter, in FIG. 4D, the tablet device 60 is released from the latching element 110 by pushing the latching element 110, so as to be disassembled from the docking station 50. Moreover, after the tablet device 60 is released from the latching element 110, the latching element 110 is moved to a predetermined position along the third axial direction through a restoring force (the repelling force between the magnets 122 and 124) of the first restoring element 120, and the latching element 110 is fixed to a predetermined position through an interference between a local part thereof and the fixing base 52. Thereafter, when the tablet device 60 is re-assembled to the docking station 50, the tablet device 60 can be latched to the latching element 110 by pushing the latching element 110 in case that the stopping element 130 moves away from the latching element 110, and a process thereof is shown in FIG. 4D to FIG. 4B. Thereafter, the pushing element 150 is moved away from the stopping element 130, so that the stopping element 130 is moved to stop the latching element 110 through the restoring force of the second restoring element 140, and a process thereof is shown in FIG. 3B to FIG. 3A and FIG. 4B to FIG. 4A. According to the above descriptions, when the docking station 50 is placed on the desktop, and the tablet device 60 is in the spread state, the tablet device 60 can be disassembled from the docking station 50 or assembled to the docking station 50 according to an actual requirement. When the docking station 50 is lifted from the desktop, or when the tablet device 60 is in the overlapping state, the tablet device 60 cannot be disassembled from the docking station 50, and cannot be assembled to the docking station 50. Therefore, the docking station 50 of the present embodiment has good fixability and is easy to be disassembled.

Figure 5:
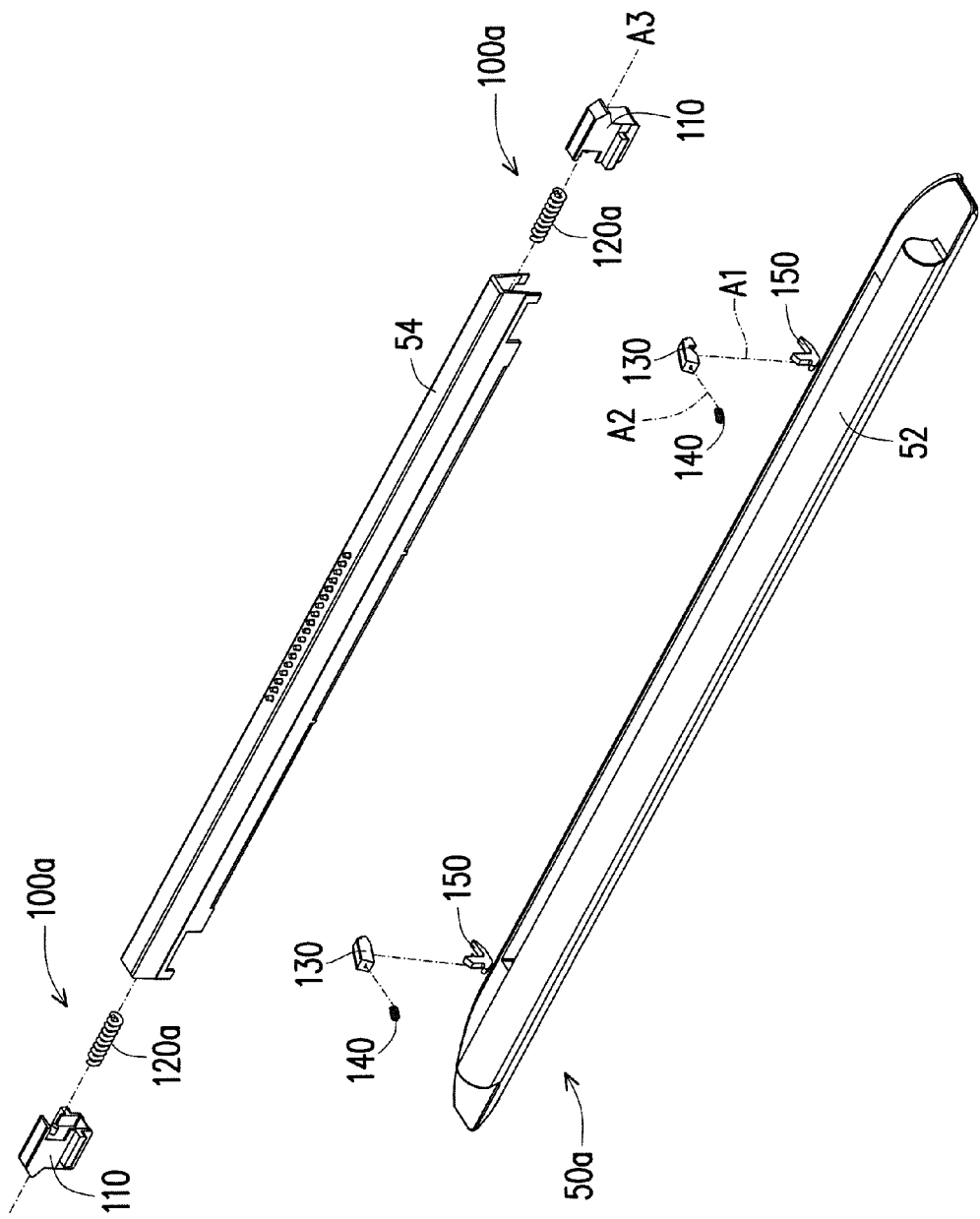
FIG. 5 is a partial exploded view of a docking station according to an embodiment of the invention.
Figure 6A:
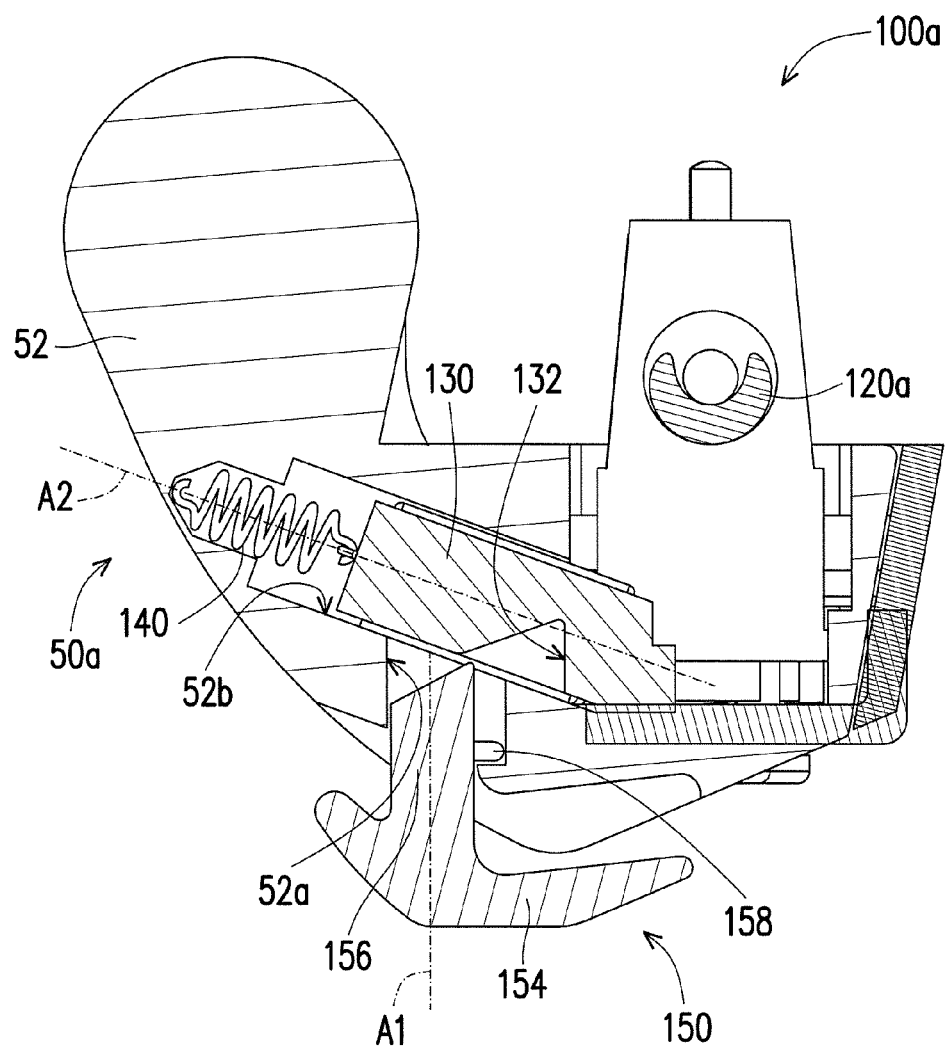
FIG. 6A is a partial cross-sectional view of the docking station of FIG. 5.

FIG. 5 is a partial exploded view of a docking station according to an embodiment of the invention. FIG. 6A is a partial cross-sectional view of the docking station of FIG. 5. Referring to FIG. 5 and FIG. 6A, in the present embodiment, the docking station 50a has similar structure and functions as that of the aforementioned docking station 50, and the docking station 50a can replace the docking station 50 in FIG. 1A to FIG. 1C for latching the tablet device 60. In this way, the tablet device 60 can be overlapped to the docking station 50a, or rotate and spread relative to the docking station 50a, as that shown in FIG. 1A and FIG. 1B. Moreover, the tablet device 60 can also be disassembled from the docking station 50a for independent use, as that shown in FIG. 1C. Therefore, the tablet device 60 can be assembled to the docking station 50a or disassembled from the docking station 50a according to an actual requirement.

In detail, in the present embodiment, the docking station 50a includes a fixing base 52, a shielding element 54, an expanding element 56 and two latching modules 100a, i.e. a main difference between the docking station 50a and the aforementioned docking station 50 lies in the latching module 100a. Implementations of the fixing base 52, the shielding element 54 and the expanding element 56 may refer to the aforementioned description, which are not repeated. The latching module 100a includes the latching element 110, a first restoring element 120a, the stopping element 130, the second restoring element 140 and the pushing element 150, i.e. a main difference between the latching module 100a of the docking station 50a and the latching module 100 of the aforementioned docking station 50 lies in the first restoring element 120a. Implementations of the latching element 110, the stopping element 130, the second restoring element 140 and the pushing element 150 may refer to the aforementioned description, which are not repeated. In the present embodiment, the first restoring element 120a is connected to the latching element 110 and the fixing base 52, and drives the latching element 110 to latch the tablet device 60. The first restoring element 120a is, for example, an elastic element, which is connected to the latching element 110 and the fixing base 52 and is in a compressing state, so that the elastic element used as the first restoring element 120a can drive the latching element 110 to latch the tablet device 60 through an elastic restoring force thereof. In other words, based on the elastic restoring force of the elastic element used as the first restoring element 120a, the latching element 110 can latch tablet device 60. Therefore, the type of the first restoring element is not limited by the invention, which can be selected according to an actual requirement.

Figure 6B:
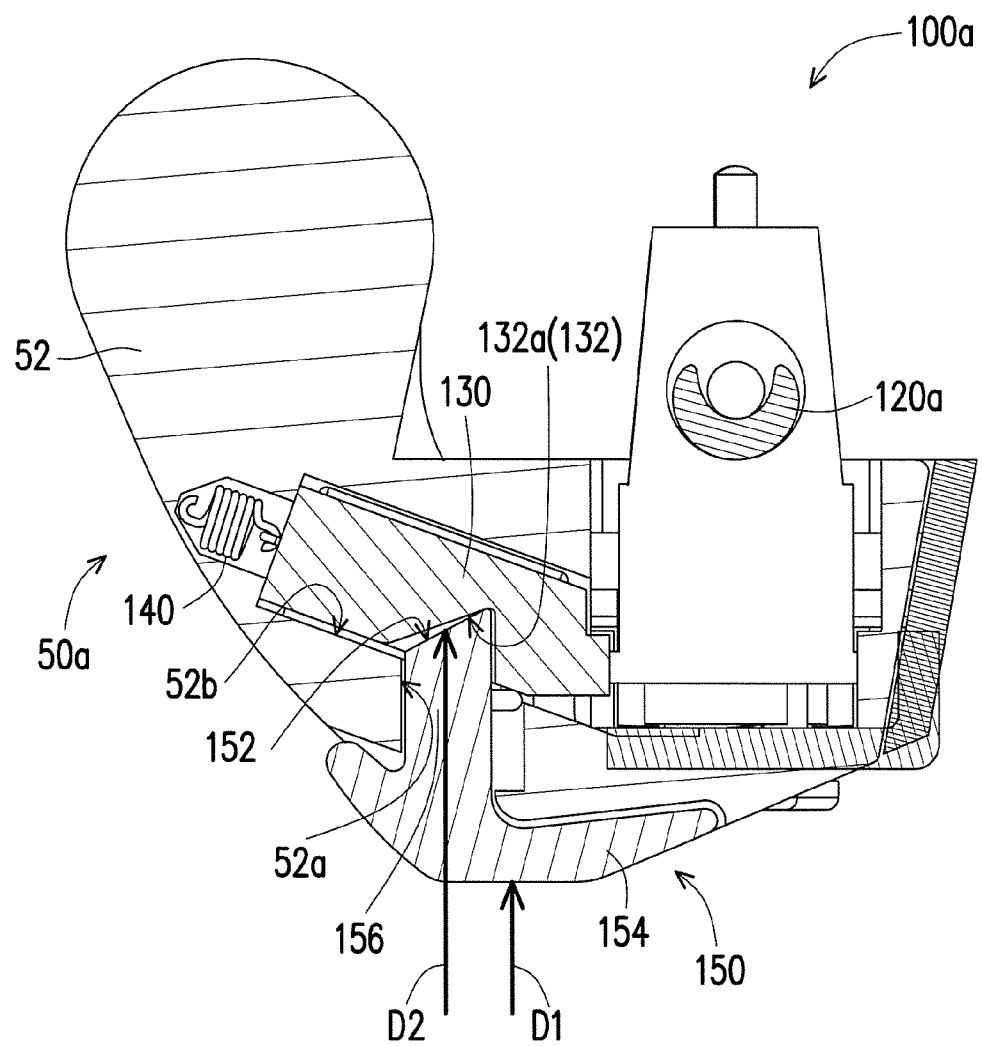
FIG. 6B is a motion schematic diagram of the docking station of FIG. 6A.

FIG. 6B is a motion schematic diagram of the docking station of FIG. 6A. Referring to FIG. 5, FIG. 6A and FIG. 6B, similarly, in the present embodiment, the stopping element 130 is movably disposed on the fixing base 52, and is coupled to the latching element 110 (shown in FIG. 5), and is driven by the second restoring element 140 to stop the latching element 110 from generating displacements (shown in FIG. 6A), such that the latching element can stably latch the tablet device 60. In this way, the docking station 50a of the present embodiment has good fixability. Moreover, in the present embodiment, the pushing element 150 is movably disposed on the fixing base 52, and is located under the stopping element 130, so as to insert into the recess 132 of the stopping element 130 (shown in FIG. 6B) through being pushed and to drive the stopping element 130 to move away from the latching element 110. For example, when the docking station 50a is placed on the desktop, and the tablet device 60 is in the spread state (as shown in FIG. 1B), the pushing portion 154 of the pushing element 150 leans against the desktop and is pushed by the same, such that the inserting portion 156 of the pushing element 150 is inserted into the recess 132 along the inserting slot 52a (the first axial direction A1). Thereafter, the pushing element 150 drives the stopping element 130 to move away from the latching element 110 along the sliding slot 52b (the second axial direction A2), i.e. the stopping element 130 is withdrawn from a place between the first restoring element 120a and the latching element 110, as that shown in FIG. 6A to FIG. 6B. Moreover, when the docking station 50a is lifted from the desktop, the pushing element 150 can move out from the recess 132 through a manual operation or through gravity, and the stopping element 130 is driven by the restoring force of the second restoring element 140 and is moved to stop the latching element 110, as shown in FIG. 6B to FIG. 6A. In this way, when the docking station 50a is placed on the desktop, and the tablet device 60 is in the spread state (and included angle between the pushing direction D1 and the inserting direction D2 ranges from −45 degrees to 45 degree), the tablet device 60 in the spread state can be disassembled from the docking station 50a or assembled to the docking station 50a according to an actual requirement. Comparatively, when the docking station 50a is placed on the desktop, and the tablet device 60 is in the overlapping state (shown in FIG. 1A), the pushing element 150 cannot be pushed into the recess 132, so that the stopping element 130 maintains stopping the latching element 110, and the tablet device 60 in the overlapping state cannot be disassembled from the docking station 50a, so as to prevent separation of the docking station 50a and the tablet device 60 during a carrying process, i.e. as the stopping element 130 stops the latching element 110, the tablet device 60 is prevented from falling off from the docking station 50a during the carrying process. Further implementation of the stopping element 130 and the pushing element 150 may refer to the aforementioned descriptions, which are not repeated.

Figure 7A:
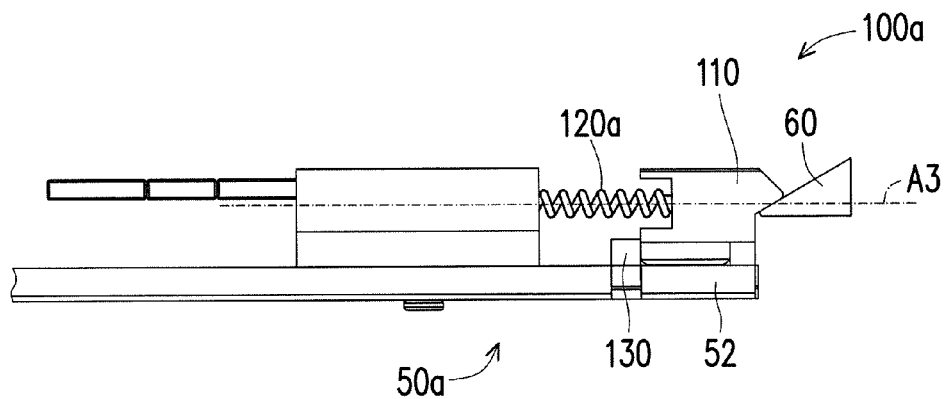
FIG. 7A to FIG. 7D are schematic diagrams of disassembling the docking station and the tablet device of FIG. 5.
Figure 7B:
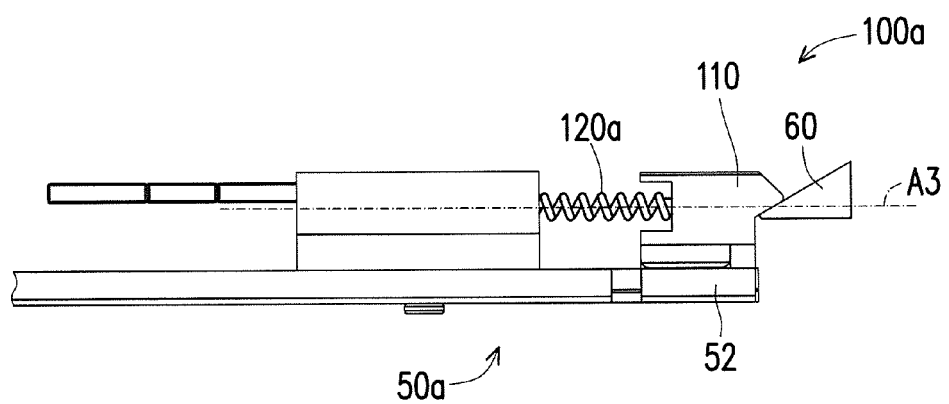
Figure 7C:
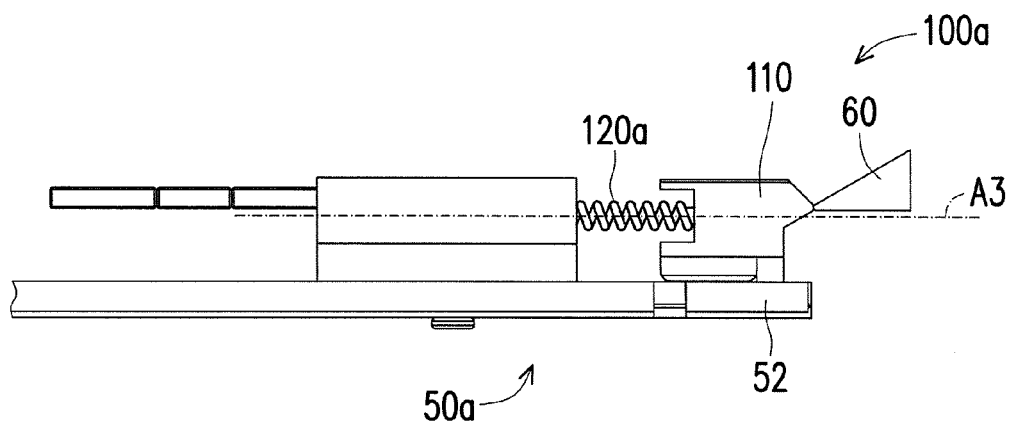
Figure 7D:
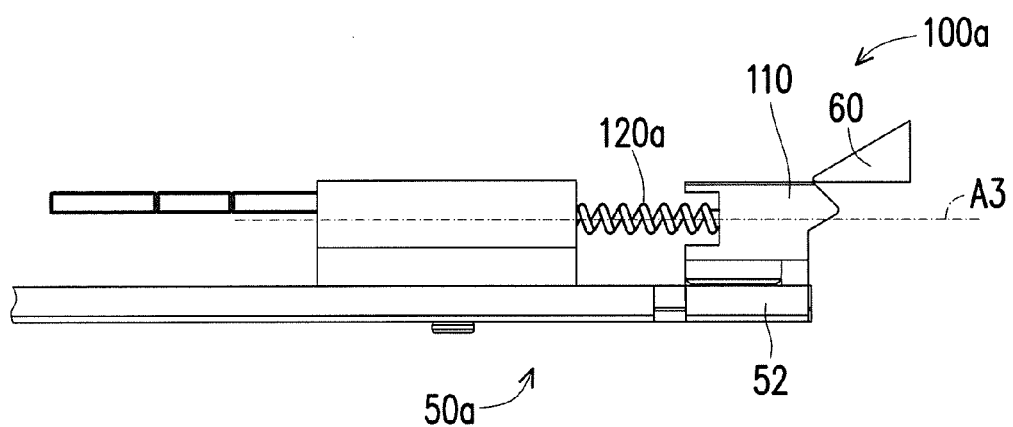

FIG. 7A to FIG. 7D are schematic diagrams of disassembling the docking station and the tablet device of FIG. 5. Similarly, in FIG. 7A, the latching element 110 latches a local part of the tablet device 60, and the stopping element 130 stops the latching element 110 from generating displacements along the third axial direction A3. In this way, the tablet device 60 cannot be disassembled from the docking station 50 through an external force under a premise that the docking station 50 and the tablet device 60 are not damaged. Thereafter, in FIG. 7B, the stopping element 130 moves away from the latching element 110 through the pushing element 150 (shown in FIG. 6A and FIG. 6B), and a process thereof is as that shown in FIG. 4A to FIG. 4B. Thereafter, in FIG. 7C, since the stopping element 130 has moved away from the latching element 110, the latching element 110 latches the tablet device 60 only through the elastic restoring force of the elastic element used as the first restoring element 120a. Now, the tablet device 60 can be moved relative to the latching element 110 through an external force, wherein the external force is greater than the elastic restoring force of the elastic element used as the first restoring element 120a, such that the tablet device 60 pushes the latching element 110 to move along the third axial direction A3 through moving relative to the latching element 110. Thereafter, in FIG. 7D, the tablet device 60 is released from the latching element 110 by pushing the latching element 110, so as to be disassembled from the docking station 50a. Moreover, after the tablet device 60 is released from the latching element 110, the latching element 110 is moved to the predetermined position along the third axial direction through a restoring force of the first restoring element 120a (the elastic restoring force of the elastic element). Thereafter, when the tablet device 60 is re-assembled to the docking station 50a, the tablet device 60 can be latched to the latching element 110 by pushing the latching element 110 in case that the stopping element 130 moves away from the latching element 110, and a process thereof is shown in FIG. 7D to FIG. 7B. Thereafter, the pushing element 150 is moved away from the stopping element 130, so that the stopping element 130 is moved to stop the latching element 110 under the restoring force of the second restoring element 140, and a process thereof is shown in FIG. 6B to FIG. 6A and FIG. 7B to FIG. 7A. In this way, the docking station 50a of the present embodiment has good fixability and is easy to be disassembled.

In summary, in the docking station of the invention, the latching element of the latching module is adapted to latch the tablet device, wherein the first restoring element drives the latching element to latch the tablet device, the stopping element stops the latching element from generating displacements, and the second restoring element drives the stopping element to stop the latching element. In this way, the latching element that latches the tablet device is limited by being driven through the first restoring element and is limited by the stopping element driven by the second restoring element to fix to a predetermined position, so as to avoid a situation that the tablet device latched to the docking station falls off from the docking station due to sway of the tablet device generated during a carrying process. Moreover, the pushing element is adapted to be pushed and inserted into the recess to drive the stopping element to move away from the latching element. In this way, the tablet device is adapted to be released from the latching element by pushing the latching element after the stopping element moves away from the latching element. When the tablet device is re-assembled to the docking station, the tablet device can be latched to the latching element by pushing the latching element in case that the stopping element moves away from the latching element, and the pushing element is again moved away from the stopping element such that the stopping element is moved to stop the latching element under the restoring force of the second restoring element, and the latching element again latches the tablet device. Therefore, the docking station of the invention has good fixability and is easy to be disassembled.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A docking station, adapted to latch a tablet device, the docking station comprising:
    a fixing base; and
    at least one latching module, comprising:
        a latching element, movably disposed on the fixing base, and adapted to latch the tablet device;
        a first restoring element, connected to the latching element and the fixing base, and driving the latching element to latch the tablet device;
        a stopping element, movably disposed on the fixing base, and coupled to the latching element to stop the latching element from generating displacements, and the stopping element having a recess;
        a second restoring element, connected to the stopping element and the fixing base, and driving the stopping element to stop the latching element; and
        a pushing element, movably disposed on the fixing base, and disposed at one side of the stopping element, wherein the pushing element is adapted to be pushed and inserted into the recess, so as to drive the stopping element to move away from the latching element, and the tablet device is adapted to be released from the latching element by pushing the latching element after the stopping element moves away from the latching element.

2. The docking station as claimed in claim 1, wherein the first restoring element comprises a pair of magnets repelling each other, and the magnets are respectively disposed on the latching element and the fixing base to drive the latching element to latch the tablet device.

3. The docking station as claimed in claim 1, wherein the first restoring element comprises an elastic element, and the elastic element is connected to the latching element and the fixing base to drive the latching element to latch the tablet device.

4. The docking station as claimed in claim 1, wherein the second restoring element comprises a pair of magnets repelling each other, and the magnets are respectively disposed on the stopping element and the fixing base to drive the stopping element to stop the latching element.

5. The docking station as claimed in claim 1, wherein the second restoring element comprises an elastic element, and the elastic element is connected to the stopping element and the fixing base to drive the stopping element to stop the latching element.

6. The docking station as claimed in claim 1, wherein the pushing element is inserted into the recess along a first axial direction, and the stopping element moves away from the latching element along a second axial direction, wherein the first axial direction and the second axial direction include an acute angle.

7. The docking station as claimed in claim 6, wherein the fixing base has an inserting slot and a sliding slot, the inserting slot extends along the first axial direction, the sliding slot extends along the second axial direction, and the inserting slot and the sliding slot are communicated to each other, the stopping element is movably disposed in the sliding slot, and the pushing element is movably disposed in the inserting slot, and when the pushing element is inserted into the recess along the inserting slot, the stopping element moves away from the latching element along the sliding slot.

8. The docking station as claimed in claim 6, wherein the latching element is pushed along a third axial direction to release latching the tablet device after the stopping element moves away from the latching element along the second axial direction, the first axial direction is perpendicular to the third axial direction, and the second axial direction is perpendicular to the third axial direction.

9. The docking station as claimed in claim 1, wherein the recess of the stopping element has a first slope facing the pushing element, the pushing element has a second slope facing the stopping element, and the first slope and the second slope are matched to each other.

10. The docking station as claimed in claim 1, wherein the pushing element has a pushing portion and an inserting portion connected to each other, the pushing portion is located outside the fixing base, and the inserting portion is located inside the fixing base and corresponds to the recess, and the pushing element is adapted to be pushed through the pushing portion and is inserted into the recess through the inserting portion.

11. The docking station as claimed in claim 1, wherein the pushing element has a pushing direction and an inserting direction, the pushing element is adapted to be pushed along the pushing direction, and is adapted to be inserted into the recess along the inserting direction, and an included angle between the pushing direction and the inserting direction ranges from −45 degrees to 45 degrees.

12. The docking station as claimed in claim 1, wherein the number of the latching modules is two, the latching modules are respectively located at two opposite sides of the fixing base, and the first restoring elements respectively drive the corresponding two latching elements to move towards the two opposite sides of the fixing base to latch the tablet device.

* * * * *